(12) United States Patent
Zimmer et al.

(10) Patent No.: US 11,007,653 B2
(45) Date of Patent: May 18, 2021

(54) GRIPPING DEVICE HAVING A SWITCHING MODULE

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 223 days.

(21) Appl. No.: 16/337,697

(22) PCT Filed: Oct. 2, 2017

(86) PCT No.: PCT/DE2017/000328
§ 371 (c)(1),
(2) Date: Mar. 28, 2019

(87) PCT Pub. No.: WO2018/064995
PCT Pub. Date: Apr. 12, 2018

(65) Prior Publication Data
US 2020/0030993 A1 Jan. 30, 2020

(30) Foreign Application Priority Data

Oct. 4, 2016 (DE) ...................... 10 2016 011 761.3

(51) Int. Cl.
*B25J 15/02* (2006.01)
*B25J 13/08* (2006.01)
*B23Q 7/04* (2006.01)

(52) U.S. Cl.
CPC ............ *B25J 15/028* (2013.01); *B23Q 7/043* (2013.01); *B25J 13/082* (2013.01); *B25J 15/0226* (2013.01)

(58) Field of Classification Search
CPC .... B25J 15/0253; B25J 15/028; B25J 13/082; B25J 13/085; B25J 19/02; B25J 19/027;
(Continued)

(56) References Cited

U.S. PATENT DOCUMENTS 4,783,107 A * 11/1988 Parker .................... B25J 13/082
294/213
5,090,757 A * 2/1992 Huber ...................... B25J 13/08
294/119.1
(Continued)

FOREIGN PATENT DOCUMENTS

DE 3640689 A1 6/1988
DE 3910801 A1 10/1990
(Continued)

*Primary Examiner* — Dean J Kramer
(74) *Attorney, Agent, or Firm* — Smartpat PLC

(57) ABSTRACT

A gripping device includes carriages or pivot arms carrying gripping elements. The carriages or pivot arms are mounted and guided in a base body and are drivable by at least one cylinder-piston unit. A switching module is mounted on the base body. The switching module includes at least one pressure medium connection and at least one electrical connection. At least one electrically controllable valve, which is switching a pressure medium, and at least one electronic controller for implementing external and internal control signals are arranged in the control module. The internal control signals originate from at least one sensor which detects at least one physical characteristic variable of the carriage(s) and/or the cylinder-piston unit at least in or on the base body. The gripping device can be adapted to at least one machine control system with a minimum interconnection and programming effort.

16 Claims, 7 Drawing Sheets

(58) Field of Classification Search
CPC ... B25J 15/0226; B23Q 7/043; Y10S 294/907
USPC .......................................................... 294/207
See application file for complete search history.

(56) References Cited

U.S. PATENT DOCUMENTS

| | | | | |
|---|---|---|---|---|
| 5,837,967 | A * | 11/1998 | Sperling | B25B 5/087 |
| | | | | 219/125.1 |
| 6,283,475 | B1 * | 9/2001 | Stubben | A63F 9/30 |
| | | | | 273/448 |
| 6,463,835 | B1 | 10/2002 | Segawa et al. | |
| 6,827,381 | B1 * | 12/2004 | Reichert | B25J 15/028 |
| | | | | 294/119.1 |
| 6,938,938 | B2 * | 9/2005 | Risle | B25J 15/0253 |
| | | | | 294/119.1 |
| 8,226,142 | B2 * | 7/2012 | Gillespie | H01L 21/68707 |
| | | | | 294/213 |
| 8,585,776 | B2 * | 11/2013 | Lind | B25J 15/0009 |
| | | | | 623/26 |
| 2010/0123325 | A1 | 5/2010 | Maffeis | |
| 2014/0028118 | A1 | 1/2014 | Sakano | |
| 2014/0156066 | A1 | 6/2014 | Sakano | |
| 2018/0085929 | A1 | 3/2018 | Zimmer et al. | |

FOREIGN PATENT DOCUMENTS

| | | |
|---|---|---|
| DE | 102006045783 | 6/2008 |
| DE | 102007055460 A1 | 5/2009 |
| DE | 102013107701 A1 | 1/2014 |
| DE | 102015004404 A1 | 10/2016 |
| EP | 0205141 A2 | 12/1986 |
| EP | 2286964 B1 | 10/2015 |
| JP | H03166605 A | 7/1991 |

* cited by examiner

Fig. 5
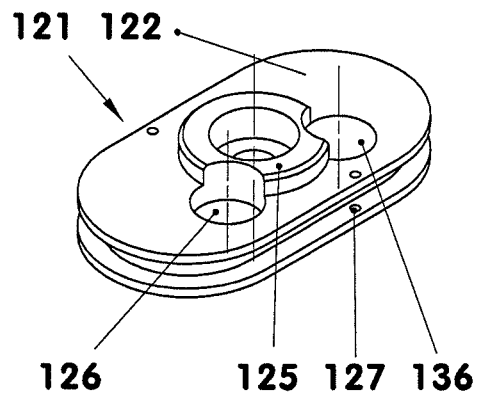
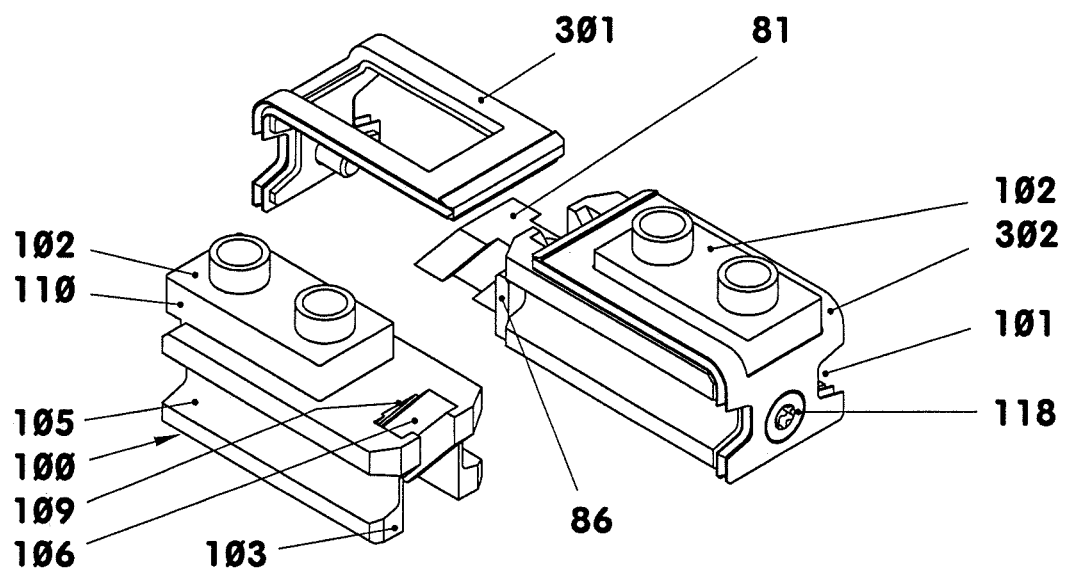
Fig. 6

GRIPPING DEVICE HAVING A SWITCHING MODULE

TECHNICAL FIELD

The disclosure relates to a gripping device comprising carriages or pivot arms, which carry gripping elements, wherein the carriages or pivot arms are mounted and guided in a base body and are drivable by at least one cylinder-piston unit between an open and a closed position.

BACKGROUND

Such a gripping device is known from DE 10 2015 004 404 A1. Its housing with the integrated driving cylinder-piston unit is externally supplied with compressed air via two pneumatic lines. A signal cable also leads away from an assembled position sensor. The valves required for wiring the cylinder-piston unit are accommodated in an externally arranged switching cabinet. The gripping device is controlled from there.

DE 10 2007 055 460 A1 describes a valve block that can be attached to a consumer. The valve block is connected to a switching cabinet via a compressed air line and several cables.

SUMMARY

The present invention is based on the problem of developing a gripping device that can be adapted to at least one machine controller with minimal wiring and programming effort. Handling and adjustment to different gripping tasks are also to be made easier.

This problem is solved by a gripping device as claimed. An electrically controllable switching module housed in a module housing can be attached to a base body. The switching module has at least one pressure medium connection and at least one electrical connection. The electrical connection comprises both load lines and control lines. The switching module contains at least one electrically controllable valve switching the pressure medium and at least one electronic computer and memory module for converting external and internal control signals and for evaluating them. The internal control signals originate from at least one sensor, which detects at least one physical parameter from the carriage or carriages and/or from the cylinder-piston unit, at least in or on the base body or in the module housing.

The switching module is designed as an easily exchangeable unit. Its geometrical shape is designed in such a manner that it can be arbitrarily adapted within a group of gripper types. Separate module housings are available for different groups of gripper types, which have different stroke paths and gripping forces. The base body of the individual gripping device has a primary adapter surface, via which it could previously be attached to the machine part carrying the gripping device. The switching module is adapted to this adapter surface, which is also the lower side of the base body, usually by simply screwing it on. In this manner, the gripping device is only connected to the machine controller via a cable and a compressed air line or hydraulic line. Thereby, the cable and the fluid line are located close to each other, such that, in a common cable sheath, they can be guided along the arms of the handling devices supporting them in a space-saving manner.

All switching modules serve—independent of the type of bearing of the gripping elements—for the electrical control of pneumatic or hydraulic gripping devices.

If, for example, a parallel or multi-finger gripper is used as the gripping device, the carriages used to guide the gripping elements in the gripper housing can have almost any cross-section transverse to their stroke direction. In addition to the cross-section shown in the embodiment, rectangular, round, oval and sawtooth cross-sections, among others, are also conceivable. The carriages are supported on all sides transversely to the gripping direction. For example, they can also be mounted one behind the other in just one guide rail, groove or bore.

If the gripping devices are, for example, angle grippers, the usually exchangeable gripping elements sit on gripping element carriers designed as swivel arms.

The carriages—or in the case of angular grippers, the gripper element carriers—are driven, for example, by several gearboxes arranged one behind the other, for example, a spur gearbox, a worm gearbox and a spindle gearbox or a cam gearbox. Instead of or in addition to such gearboxes, sliding wedge gearboxes, wedge-hook gearboxes, lever gearboxes, splitter gearboxes or power transmission gearboxes can also be used. The gripping devices can be used in both external and internal grippers.

BRIEF DESCRIPTION OF THE DRAWINGS

FIG. 5: Perspective view of the piston without a piston seal from below.

FIG. 6: Perspective view of the carriages, the guide seals and the double wedge from above.

DETAILED DESCRIPTION

Figure 1:
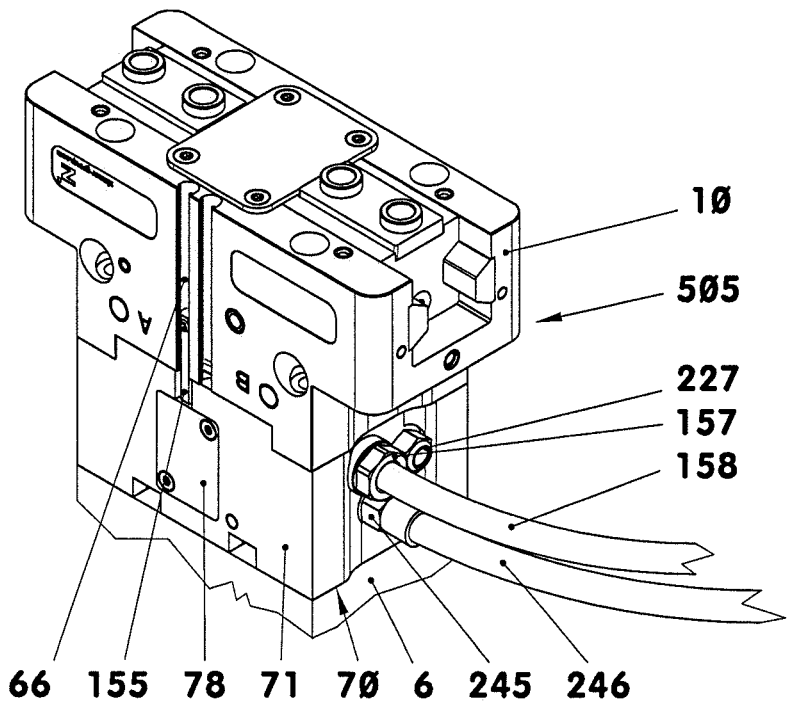
FIG. 1: Perspective view of a parallel gripper with an assembled switching module.

FIGS. 1 to 4 show a parallel gripping device with two gripper jaws (1, 2) each seated on carriages (100, 101). The carriages (100, 101), which are movable in their longitudinal direction, are guided in a housing or base body (10) in a guide groove (20), for example with plain bearings. The housing (10) accommodating the guide groove (20) also surrounds a cylinder-piston unit (120), which is for example double-acting. The cylinder-piston unit acts on the carriages (100, 101) via a double sliding wedge gearbox (80). A switching module (70) is arranged below the base body (10), via which, among other things, the pressure medium supplied to the gripping device is supplied to the cylinder-piston unit (120) in an electronically controlled manner. According to FIG. 1, the parallel gripping device is mounted on a machine or handling device part (6) carrying it via the switching module (70) connected upstream of the base body (10). Some parts of the gripping device are designed to be adjustable to achieve high-precision carriage guidance or are assembled by precisely pre-sorted parts according to narrowly tolerated dimensions.

Figure 4:
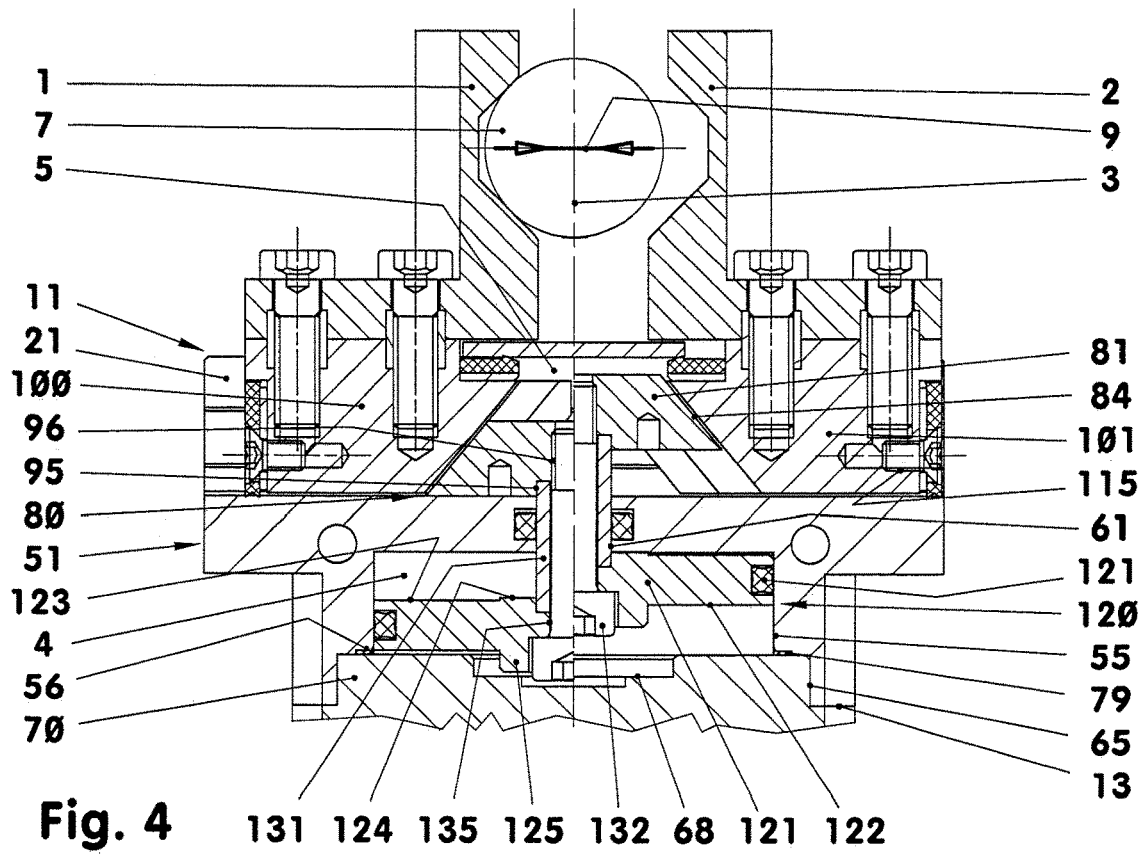
FIG. 4: Longitudinal section through the parallel gripper according to FIG. 1, but with gripper jaws. The right gripper jaw is open.

FIG. 4 shows the parallel gripping device in partial longitudinal section with two gripper jaws (1, 2) screwed on. The gripper jaws are to grip a workpiece (7) that is, for example, cylindrical. The gripper jaw (1) on the left side of the device rests against the workpiece (7), while the gripper jaw (2) on the right side of the device is shown in the open position. In contrast to the illustration in FIG. 4, due to the gearbox, the gripper jaws (1, 2) always inevitably move synchronously towards or away from each other.

The base body (10) of the parallel gripper, which is for example essentially rectangular-shaped, consists of an upper guide section (11) and a lower drive section (51). For example, it is made of the aluminum alloy AlMgSi1. The length of the base body (10), for example, is almost twice as long as its width and base body height. In the embodiment, the base body (10) is 50 mm long. For this size, the maximum stroke of each carriage (100, 101) or gripper jaw (1, 2) amounts to, for example, 2.625 mm.

The guide section (11) receives in its middle the guide groove (20), which is open upwards towards the gripping elements (1, 2), and whose e.g. rectangular cross-section measures a width of 10.7 mm and a height of 9.3 mm. In the flat side walls (23, 24) of the guide groove (20), a flat rail guide groove (26) is incorporated in each case for the later reception of a guide rail (31, 32). The individual rail guide groove (26) has a rectangular cross-section, a flat groove base and, for example, flat side walls. Here, the rail guide grooves (26) extend over the entire length of the base body (10).

Here, each guide rail (31, 32) is a substantially trapezoidal rod made of a stainless steel, for example from X90CrMoV18. The width of the guide rail (31, 32) extending, for example, over the length of the base body (10) amounts to 4 mm in the embodiment. The height of the guide rail (31, 32) measures 75% of its width. Due to the high strength of such a guide rail (31, 32), the carriages can transmit larger torques to the base body (10). As a result, the gripping device can exert large gripping forces on the workpiece (7) to be received. The individual guide rail (31, 32) has a hexagonal cross-section and has two opposite supporting flanks that are mirror-symmetrical to each other.

At least one of the guide rails (31, 32) has a transverse groove in the middle (not shown here). The latter serves as an additional wear-resistant guide for the double sliding wedge (81) used in the double sliding wedge gearbox (80). If necessary, the individual guide rails (31, 32) can also be made up of two or more sections arranged one behind the other. In the embodiment, each of the guide rails (31, 32) is fastened to the base body (10) with two countersunk screws (41) (see FIG. 3). The guide rails (31, 32) are first positioned on the base body (10) with the assistance of two locating pins (42).

The drive section (51) located below the guide section (11) essentially receives the cylinder-piston unit (120) and the channels and apertures carrying the actuating means. In the lateral areas below the guide section (11), the base body (10) is shortened on both sides by approximately 12% of the total length of the base body at a height of 38.3% of the total height of the base body.

The lower side of the base body (10) has a module housing recess (65) that is, for example, 3.5 mm deep and, for example, 12-cornered. The switching module recess extends from the front to the rear longitudinal side wall of the base body (10). A cylinder recess (55) that is, for example, 7 mm deep, protrudes from the module housing recess (65) into the base body (10) in the direction of the guide groove (20) (see FIG. 4). The cylinder recess (55) here has an oval cross-section, the length of which corresponds, for example, to 54% of the total base body length. The width of the cylinder recess (55) measures, for example, 53.7% of its length. The two radii of the oval cross-section correspond to half the width of the cylinder recess (55). There is a circumferential sealing seat indentation (56) with a flat base around the cylinder recess (55). A flat seal (79) is located in the sealing seat indentation (56).

In the center of the bottom of the cylinder recess (55), there is a through-hole (61) that connects the cylinder recess (55) to the guide groove (20). In the middle, the through-hole (61) has an insertion for receiving a piston rod sealing ring.

Figure 3:
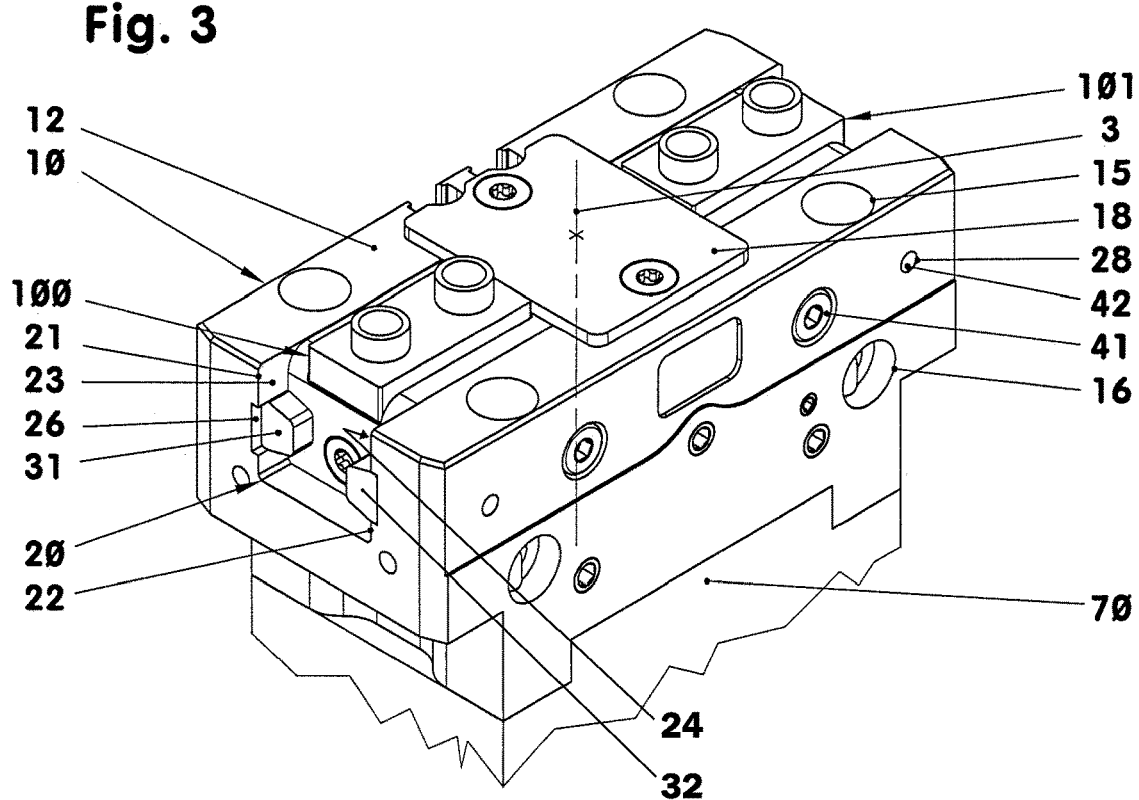
FIG. 3: Same as FIG. 1, but without a switching module.

To fasten the base body (10) to a machine carriage (6), it has four vertical bores (15) and two transverse through-holes (16). In FIG. 3, the vertical bores (15) are used specifically for fastening. Apart from two bores that are diagonally opposite to each other, all other fastening bores (15, 16) are equipped with countersinks matching the respective fastening screws.

The base body (10) has two channel-like sensor recesses (66) in the middle area of the large side wall shown in FIG. 1, which sensor recesses are also open towards this side wall. Its center lines are oriented parallel to the center line (3) of the device. Their largely U-shaped cross-sections are narrowed in the area of the side wall by projecting rear handles on both sides—as fixing protection for insertable piston position sensors (155). At least one of the sensor recesses (66) continues into the switching module (70).

The switching module (70) is adapted via its upper side (72) at the lower side of the base body (13). The switching module (70), which is made of an aluminum-silicon alloy, has an essentially cuboid-shaped module housing (71), the cross-section of which, situated perpendicularly to the center line (3), corresponds to the cross-section that the base body (10) has in the lower area of the cylinder recess (55). The height of the module housing (71) measures 35.5 mm in the embodiment.

The upper side (72) of the rigid module housing (71) fits into the 12-corner module housing recess (65) like a cover with little clearance (see FIG. 4). It has in the middle a two-stage indentation (68) into which the piston (121) of the pneumatic drive (80) can partially protrude in the closed gripper position. Four fastening bores (69) are arranged around the indentation (68); through these, the module housing (71) is screwed tightly to the base body (10) with the flat seal (79) interposed, using four cylinder screws. For receiving the screw heads of the cylinder screws, the module housing (71) has countersinks or notches that extend into the area of the long side walls (see FIGS. 1 and 2).

Figure 2:
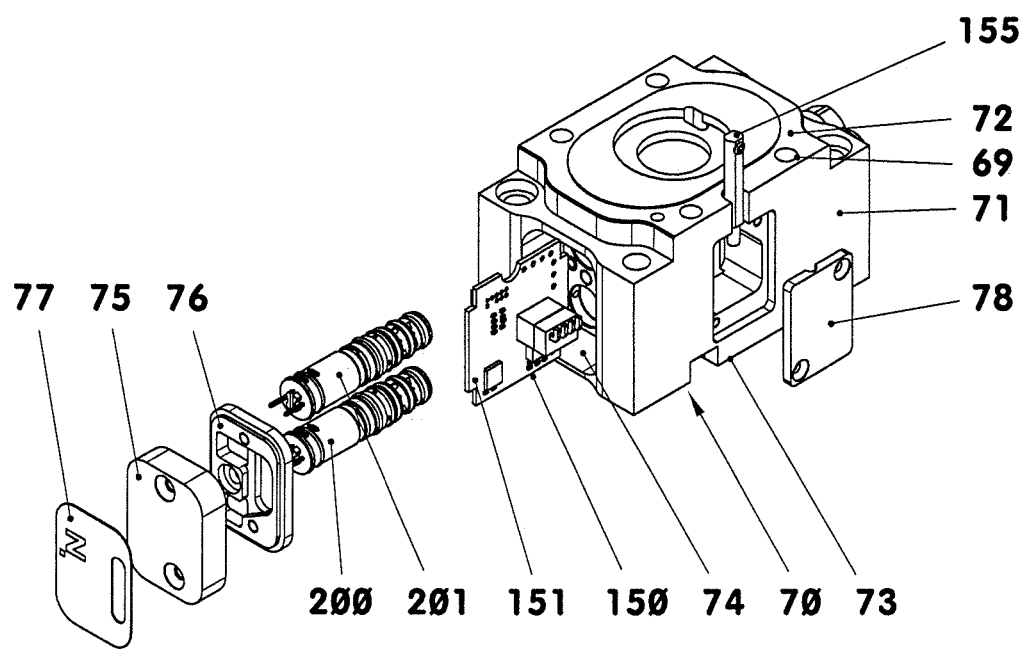
FIG. 2: Exploded view of the switching module.

According to FIG. 2, the module housing (71) has a recess (74) opening to the left, among other things for receiving the computer and memory module (150), the pneumatic valves (200, 201), possibly the valves (251, 252), the pressure sensor (180) and any indicator LEDs present, including their controller. The left opening of the recess (74) is closed by a transparent plexiglass cover (75), which is largely covered—with the exception of the openings for the indicator LEDs—by a cover plate (77).

A retaining cover (76) is arranged in the recess (74) below the plexiglass cover (75); on the one hand, this fixes a cartridge valve (200, 201) in each bore of the recess (74) and, on the other hand, this serves as holder for the indicator LEDs. In front of the cartridge valves (200, 201) and behind the retaining cover (76), the control board (151) for receiving the computer and memory module (150) is arranged in the recess (74).

The front opening of the recess (74) oriented to the right in FIG. 2 is closed with a front cover (78). The position sensor (155), among other things, can be connected to the control board (151) via the front opening.

An oval piston (121) with its two-part piston rod (131, 132) is arranged in the cylinder interior (4) surrounded by the cylinder recess (55) of the base body (10) and the upper side of the module housing (71) pneumatically acting as a cover. The cylinder interior (4) and the piston (121), for example, form a pneumatic cylinder-piston unit. The piston (121), the average wall thickness of which in the embodiment is less than one sixth of the base body height, has a three-stage through-hole (135) in the middle, wherein the middle stage has the smallest diameter, for example, of 3.2 mm.

The boring stage on the side of the piston rod has a diameter of 5 mm for receiving a piston rod sleeve (131). Around the through-hole (135), the piston (121) has a 0.2 mm disk-shaped projection (124), which serves as the upper stop of the piston (121). Its cylindrical edge can also be used for the internal guidance of a helical compression spring.

The oval piston (121) (see FIG. 5) has a circumferential quad seal ring mounted in a sealing groove to seal against the cylinder recess wall of the base body (10). In the area of the sealing groove, the piston (121) has at least one pressure compensation bore (127), the center line of which runs parallel to the center line (3), for example, and which intersects the piston (121) in the area of the sealing groove. During the supply of compressed air, the compressed air passes through the at least one pressure compensation bore (127), the diameter of which amounts to, for example, 0.7 mm, in front of the quad seal ring, such that it can be applied securely and quickly to the groove flank of the seal groove facing away from the overpressure.

The piston crown side (122) (see FIG. 5) also has a projection (125) in the central countersink of which the head of the piston rod screw (132) is located. The piston (121) has two blind holes (126) in the front area of the projection (125). If required, disk magnets (136) for monitoring the piston position are glued into such blind holes.

Here, the piston rod (131, 132) consists of the piston rod screw (132), for example a countersunk screw, and a piston rod sleeve (131) fitted to it. Together with the piston (121) and the double sliding wedge (81) of the double sliding wedge gearbox (80), such two parts form a rigid assembly as soon as the piston rod screw (132) is inserted in the middle of a countersunk bore (95) of the double sliding wedge (81) and screwed into the threaded bore (96) adjacent to the countersunk bore.

The double sliding wedge (81), which is arranged in the guide groove (20) as part of a double sliding wedge gearbox (80), is essentially a square bar-like component with a square cross-section. In its middle area, a lateral vertically protruding support bar (85, 86) is molded on both sides (see FIGS. 6 and 7). The support bar (85, 86), which extends parallel to the center line (3) over the entire height of the double sliding wedge, is, for example, 1.2 mm wide. For example, it projects 1.8 mm beyond its basic cuboid shape.

The double sliding wedge (81) has a front surface (83, 84) beveled in the sliding wedge angle at each of its ends on the front side. The sliding wedge angle, for example, is between 20 and 50 angular degrees with respect to the gripping direction (9). In the embodiment, it amounts to 50 angular degrees.

Parallel to the beveled front sides (83, 84), there is a wedge groove (87) between one front side (83, 84) and one support bar (85, 86) per longitudinal side of the double sliding wedge (81). The respective wedge groove (87) is oriented parallel to the nearest front side (83, 84). It thereby has a rectangular cross-section. The double sliding wedge (81) thus has two wedge grooves (87) on each longitudinal side. Since it is constructed symmetrically to the vertical central longitudinal plane of the base body (K), each wedge groove (87) of one longitudinal side is opposite a second. In this manner, each frontal area on the front side of the double sliding wedge (81) forms a T-shaped wedge bar (91, 92) arranged obliquely when viewed in cross-section.

Each wedge bar (91, 92) of the double sliding wedge (81) engages in a positive-locking manner in a carriage (100, 101) mounted in the guide groove (20). Each of the carriages is primarily a cuboid-shaped body in which carriage guide grooves (105) are incorporated on both sides. With these grooves (105), the individual carriage (100, 101) is mounted on plain bearings on the guide rails (31, 32). The carriages (100, 101) are made, for example, of 16MnCr5 case-hardened steel.

The individual carriage (100, 101), the width of which is, for example, 0.2 mm smaller than the width of the guide groove (20), has, in the front surface (103) turned towards the double sliding wedge (81), an obliquely arranged T-groove (106) with which the carriage (100, 101) encompasses the wedge bar (91, 92) of the double sliding wedge (81) with a clearance of less than 0.1 mm. According to FIGS. 6 and 7, lubricating pockets (109) that can be filled with lubricant are worked into the bottom of the T-groove (106).

On the upper side of each carriage (100, 101), there is an adapter attachment (110) that is, for example, cuboid-shaped, and, for example, 2.8 mm high, which, when the carriage (100, 101) is mounted, protrudes from the guide groove (20) by, for example, 1.2 mm at the top—projecting beyond the upper side of the base body (12). At the same time, the adapter attachment (110) projects, for example 1.5 mm, beyond the external front side facing away from the T-groove (106). The flat upper side (102) of the adapter attachment (110) has two threaded bores equipped with cylinder countersinks, to which the gripper jaws (1, 2) are releasably attached. Centering sleeves for the precise, at least positive-locking positioning of the gripper jaws (1, 2) on the carriage (100, 101) are inserted in the cylinder countersinks. If necessary, the gripper jaws (1, 2) may also be directly molded or fixed in a non-releasable manner.

The carriages (100, 101) are arranged one behind the other in the guide groove (20) (see FIG. 2), in such a manner that, with a minimum distance between the gripper jaws, their front sides (103) which face each other contact or at least almost touch each other.

The middle area of the groove opening of the guide groove (20) is closed with a cover plate (18) that is, for example, rectangular. The cover plate (18) is designed to be so wide that, in the closed position of the gripper jaws (1, 2), the two carriages (100, 101) just do not touch this.

Figure 7:
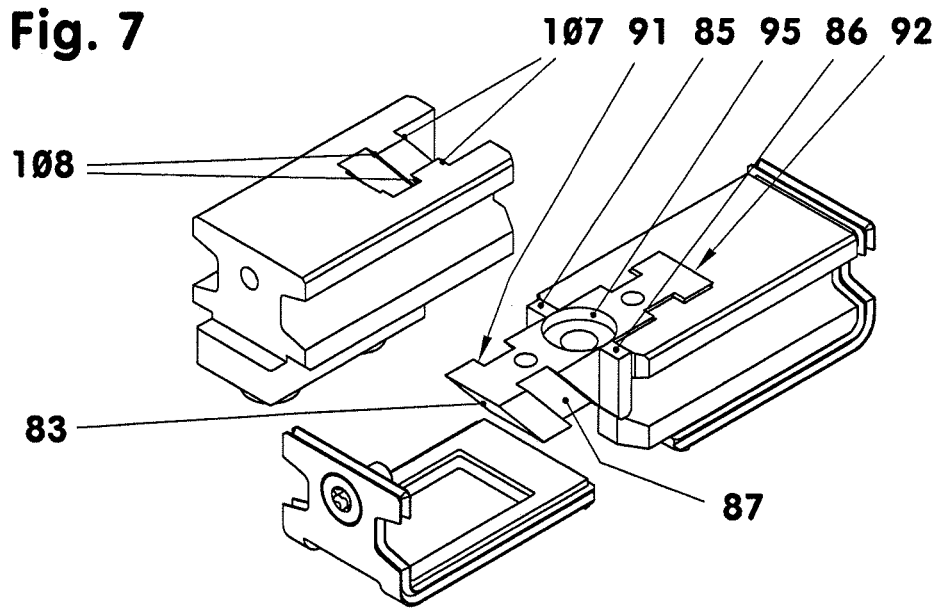
FIG. 7: Perspective view of the carriages, the guide seals and the double wedge from below.

In order to protect the inside of the housing (5) and the guide rails (31, 32) from dirt or other impurities that cause wear, angular guide groove seals (301, 302) are placed on the carriage (100, 101) and screwed tight, as shown in FIGS. 6 and 7. In the embodiment, the individual guide groove seal (301, 302) surrounds the adapter attachment (110) of the respective carriage (100, 101).

Figure 8:
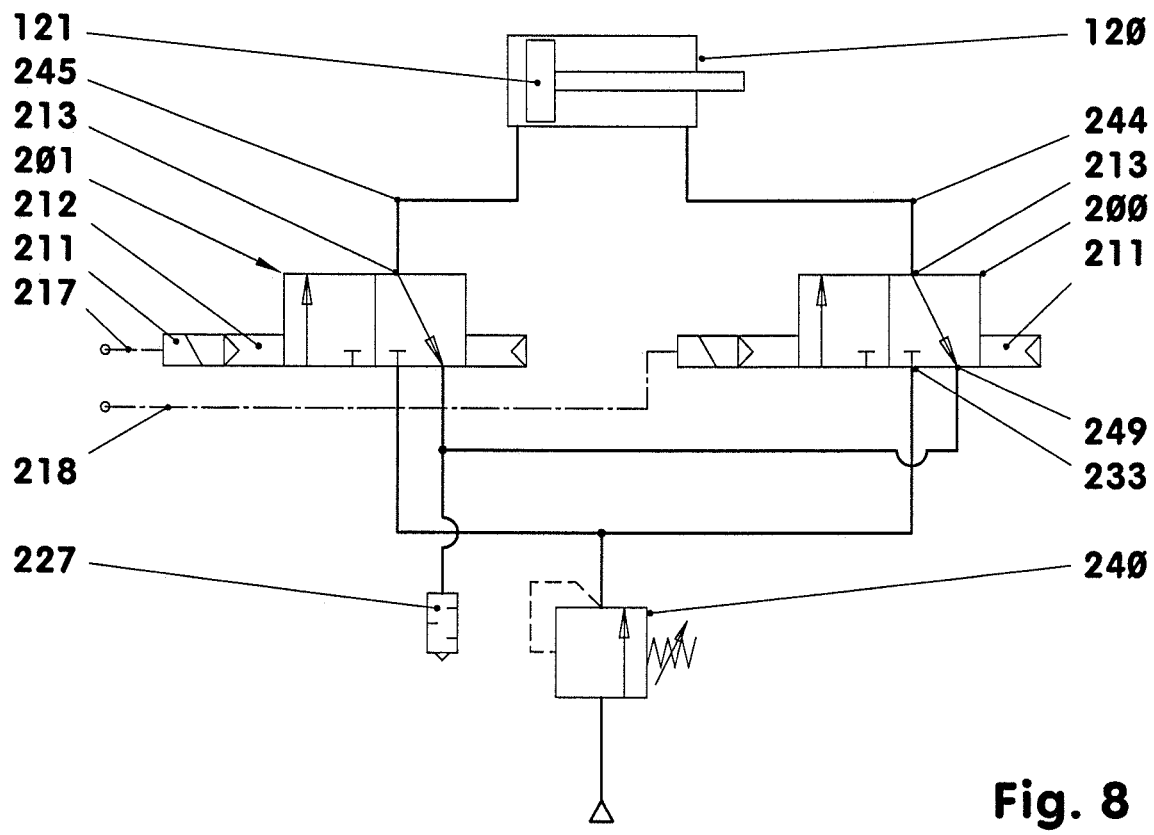
FIG. 8: Pneumatic circuit diagram with a pressure relief valve.
Figure 9:
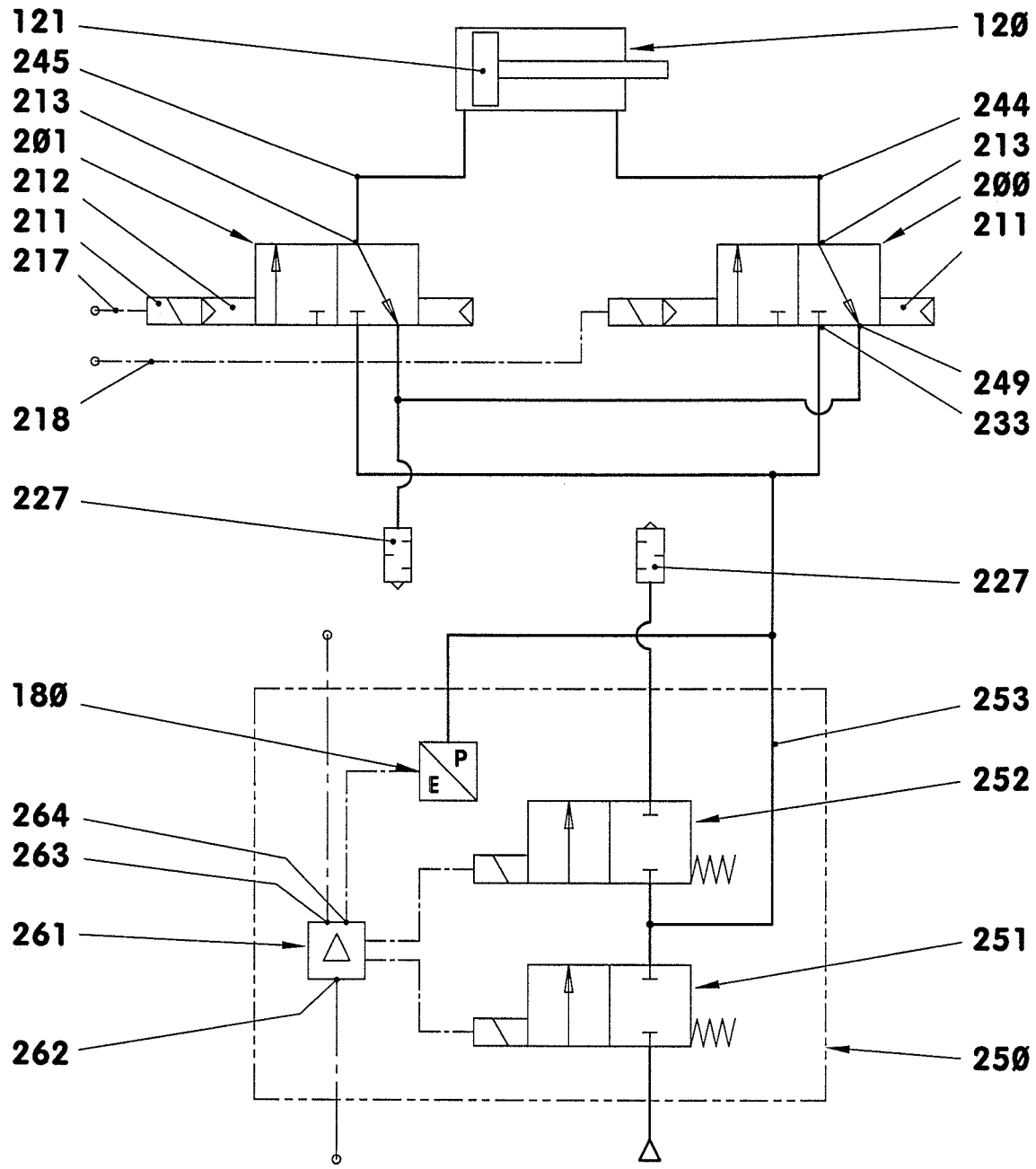
FIG. 9: Pneumatic circuit diagram with a proportional controller.

FIGS. 8 and 9 each show a pneumatic circuit diagram for the cylinder-piston unit (120). The double-acting cylinder (120) represents the pneumatic actuator of the gripping device.

Two 3/2-way valves (200, 201) are connected upstream in order to pneumatically control the cylinder-piston unit (120). The two directional valves (200, 201), which are, for example, identical in construction, each with a shut-off rest position, are pneumatically pilot-controlled on both sides (211) and can be actuated on the flow side by an electromagnet (212) or an electromechanical actuator.

A line (244, 245) leading to the cylinder of the cylinder-piston unit (12) starts at each of the working ports (213) of the 3/2-way valves. The line (244) is responsible for the gripping stroke, while the line (245) supplies the cylinder for the release of the workpiece (7) with compressed air.

According to FIG. 8, the two main inlets (233) on the directional valve side are connected to the outlet of a pressure relief valve (240), which is also integrated in the switching module (70) (for example), and which in turn is supplied via the compressed air connection (245) on the housing side (see FIG. 1). The valve vent bores (249) of the directional valves (200, 201) lead via bores inside the housing to a vent filter (227) arranged on the module housing (71); see also FIG. 1.

If the 3/2-way valves (200, 201) are equipped with electromagnets (212), such valves are electrically controlled by the computer and memory module (150) via the control lines (217) or (218).

FIG. 9 shows a pneumatic circuit diagram with which the pneumatically operating pressure relief valve (240) is replaced by an electropneumatically operating miniature proportional controller (250). The controller (250) integrated in the module housing (71) has two electromagnetically controllable 2/2-way valves (251, 252) through which the compressed air of the compressed air connection (245) (see FIG. 1) is provided to the main inlets (233) of the 3/2-way valves (200, 201).

Via its working port, the first 2/2-way valve (251) in the open position feeds the compressed air to the main inlets (233) through the line (253). The second 2/2-way valve (252) vents the line (253) via the sound absorber (227) connected to its working port. The pneumatic side of a pressure sensor (180) is connected to the line (253). In the pressure sensor, the existing pressure is converted into an electrical signal, which represents the pressure of the line (253). The signal is fed to an amplifier (261) and compared with the pressure at the pressure sensor (180). If the measured pressure is too low, the amplifier (261) opens its output leading to the first 2/2-way valve (251), in order to open the valve (251).

According to FIG. 9, the 2/2-way valves (251, 252) are in the shut-off rest position. This is always the case when the piston (121) of the cylinder-piston unit (120) is in the area of an end position.

Figure 10:
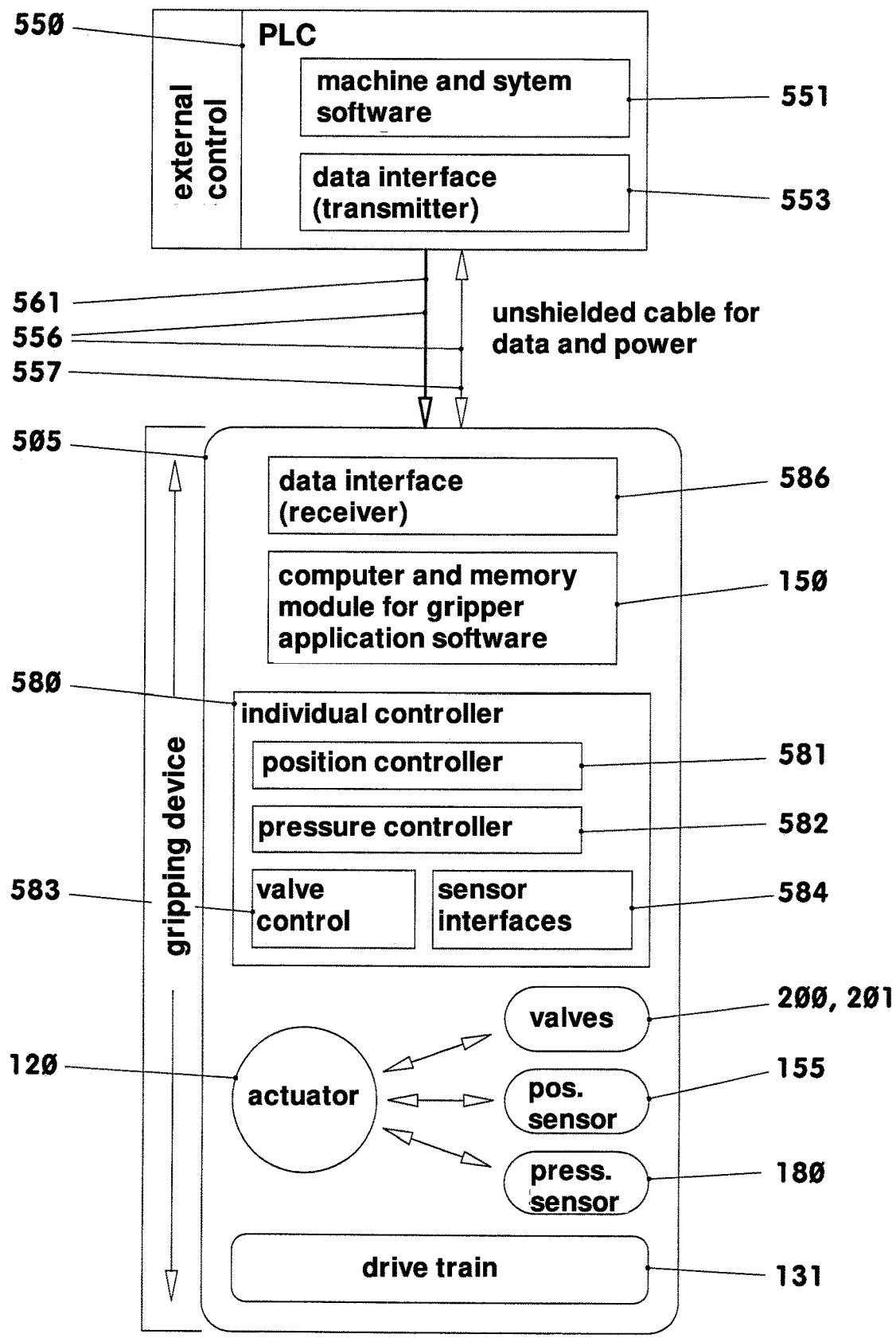
FIG. 10: Overview of the hardware and/or software modules of an individual drive with an individual controller accommodated in the gripping device.
Figure 11:
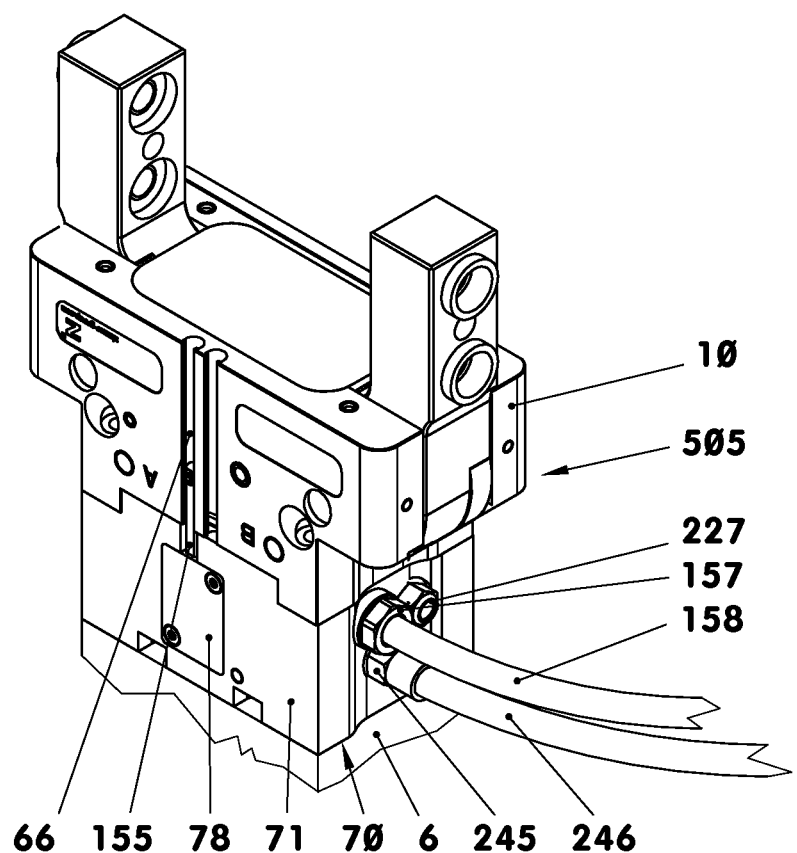
FIG. 11: Perspective view of a gripping device with swivel arms.

FIG. 10 shows an interface plan of the controller of the gripping device according to FIG. 1. In addition to an electronic controller (150), the gripping device comprises, as electrical and/or electronic assemblies, at least two directional valves (200, 201), at least one position sensor (155) per cylinder-piston unit (120) and at least one pressure sensor (180) delivering electrical signals, among other things.

The controller has a first main assembly (550), which is accommodated, for example, in the switching cabinet of the machine tool. It is referred to as the "external control." This main assembly is a programmable logic controller (550) with, for example, two PLC function assemblies (551) and (553).

The first PLC function assembly (551) is the software for the machine and/or system. Here, the PLC generates control signals by internal microprocessors depending on an internal software program that is stored in the controller's own program memory.

The second PLC function assembly (553) forms a PLC-specific data interface that communicates with the second main assembly (580), the electronics of the gripping device (505). It is an interface for point-to-point communication. Such an exchange of information can be realized, for example, by means of the IO-Link® system. The system gets by with, for example, a simple, unshielded three to five wire connection (557).

The multi-wire connection (557) is combined with the power cable (561) to form an unshielded cable (556), which then has, for example, two of five leads for power supply. The cable (557) is the only connection between the PLC (550) and the housing (10, 71) of the gripper (505). Thus, there is a simple single cable connection that is flexible and easy to handle here.

The cable (557) is connected in the gripping device (505) to the point-to-point data interface (586) or control board (151) arranged there. In addition to the data interface (586), the gripping device also contains a computer and memory module (150) that encompasses the entire gripper application software. This module stores all the parameters required for gripping the workpieces using such gripping device (505).

In addition to the geometry data required for gripping, such parameters also include material properties that are, for example, a function of the Young's modulus or a hollowed-out geometrical shape. For example, in the case of elastic solid bodies, depending on the material to be gripped, the hardness according to Shore A, B, C or D can be specified in order to calculate the addition to the gripping stroke caused by elasticity as a geometric length in conjunction with the clamping width or clamping length located between the gripper arms (1, 2). In the case of hollowed-out geometrical shape, such as coil springs or plastic containers, the spring rate caused by deformation can take the place of the Shore hardness. Alternatively, it is also possible to specify only one range of gripping force for the respective workpiece to the gripping device (505).

The controllable actuator (120), for example a cylinder-piston unit, and the position sensor (155) are connected in the gripping device to an individually designed controller (580), which is specially adapted to the combination of gripper kinematics, actuator control and the sensor, for example a position encoder.

The individual controller (580) has at least one position controller (581) as the controller functional unit, which, for example, gets by with a position control loop, since the lifting speed of the gripper arms is calculated from the position change supplied by the position sensor(s) (155) and the running time information.

A second controller functional unit is a pressure controller (582) that, with the assistance of pressure sensors, determines, for example, the height of the feed pressure and the stroke direction of the gripper arms (1, 2) during the running time.

The third controller functional unit is the sensor interface (583) of the individual controller (580). It is adapted to the power and dynamics of the actuator (120) and is directly tailored to at least one position sensor (155) and, for example, one pressure sensor (180) per stroke direction of the actuator (120). Here as well, components that allow universal access to other encoder types, such as tachogenerators, coil resolvers, optical measuring systems and the like, can be omitted. This saves board space and energy.

With the assistance of the sensors (155, 180) installed on or in the gripping device, including the timer, the gripping time can be measured in addition to measuring the gripping position and the pressure medium pressure. Statistical values such as the number of gripping operations or the level of gripping forces can also be collected. If necessary, an early warning for imminent loss of function can also be generated. Such information is either passed on to the PLC (550) or displayed on the gripping device (505), for example via LEDs or a display.

LIST OF REFERENCE SIGNS 1, 2 Gripping elements, gripper jaws
3 Center line to (10, 70, 80)
4 Cylinder interior
5 Housing interior, inside of the housing
6 Machine carriage, machine part, Handling device part
7 Workpiece
9 Gripping direction, direction of carriage travel
10 Base body, housing
11 Guide section
12 Upper side of base body
13 Lower side of base body, adapter surface
15 Fastening bores, vertical
16 Transverse bores
18 Housing cover, cover plate
20 Guide groove
21 Groove side, left
22 Groove side, right
23, 24 Side walls, guide groove walls
26 Rail guide groove
28 Locating pin bores
31, 32 Guide rail, carriage guide rail
37 Base surface, lower side of (31, 32); surface
41 Countersunk screws
42 Locating pins
51 Drive section
55 Cylinder recess, oval
56 Sealing seat indentation for flat seal
61 Through-hole, central
65 Module housing recess
66 Sensor recesses
68 Indentation in (71)
69 Fastening bores in (71)
70 Switching module
71 Module housing
72 Upper side, adapter surface
73 Lower side, adapter surface
74 Recess
75 Side cover, plexiglass cover
76 Retaining cover
77 Cover plate
78 Front cover
79 Flat seal
80 Double sliding wedge type gearbox
81 Double sliding wedge element, double sliding wedge, gear component
83, 84 Front sides, front surfaces, oblique
85, 86 Support bars
87 Wedge groove
91, 92 Wedge bar, T-shaped
95 Countersunk bore
96 Threaded bore
100, 101 Carriages
102 Upper side
103 Front side, front surface
105 Carriage guide grooves
106 T-groove
107 Wedge flats, opening system
108 Wedge flats, locking system
109 Lubricating pockets
110 Adapter attachment
115 Threaded bore for (300)
118 Screw for (300)
120 Cylinder-piston unit; drive, actuator Pneumatic, double-acting
121 Piston, oval
122 Piston crown side
123 Piston rod side
124 Projection, disk-shaped, stop
125 Projection, piston bottom side, cylindrical
126 Blind holes for 1136)
127 Pressure compensation bore
131 Piston rod sleeve, piston rod; drive train
132 Piston rod screw, piston rod
135 Through-hole
136 Disk magnets, trigger for (155)
150 Computer and memory module for gripper application software, electronic control system
151 Control board
155 Position sensor, analog; piston position sensor
157 Electrical connection, for example with cable strain relief element
158 Cable for load current and signal current; see (556)
180 Pressure sensor with electrical signal output
200, 201 Directional valves, 3/2-way valves
211 Pneumatic pilot control, both sides
212 Electromagnet, solenoid
213 Working ports on (200, 201)
217, 218 Control line, electrical
227 Sound absorber, vent filter
233 Main inlet on (200, 201)
240 Pressure relief valve
244, 245 Compressed air connection, pressure medium connection
246 Compressed air line, compressed air hose
249 Valve vent bore for (200, 201)
250 Prosectional controller, miniature prosectional controller
251 2/2-way valves, inlet
252 2/2-way valves, return flow\
253 Line
261 Amplifier
262 Reference pressure input
263 Actual pressure output
264 Actual pressure input
301, 302 Guide groove seals
505 Gripping device, parallel gripper
550 First main assembly, external control, programmable logic controller=PLC
551 First PLC function assembly, machine software
553 Second PLC function assembly, data interface for point-to-point communication
556 Unshielded cable for data and power between (550) and (505); see (158)
557 Three to five wire connection, multi-wire connection, unshielded
561 Power cable 580 Second main assembly, controller, individual
581 First controller functional unit, position controller
582 Second controller functional unit, pressure controller
583 Third controller functional unit, sensor interfaces
584 Sensor interfaces
586 Data interface for point-to-point communication

The invention claimed is:

1. A gripping device with carriages (100, 101) or swivel arms carrying gripping elements (1, 2),
   wherein the carriages (100, 101) or swivel arms are mounted and guided in a base body (10) and can be driven by at least one cylinder-piston unit (120) between an open position and a closed position,
   wherein an electrically controllable switching module (70) accommodated in a module housing (71) is attached to the base body (10),
   wherein the module housing (71) has at least one pressure-medium connection (245) and at least one electrical connection (157), the electrical connection comprising both load lines and control lines,
   wherein the switching module (70) contains within the module housing (71) and jointly mounted to the base body (10)
   at least one electrically controllable valve (200, 201) switching a pressure medium and
   at least one electronic computer and memory module (150) for converting external and internal control signals and for evaluating them,
   wherein the internal control signals originate from at least one sensor (155, 180), which detects at least one physical parameter from the carriage or carriages (100, 101) and/or from the cylinder-piston unit (120), at least in or on the base body (10) or in the module housing (71), and
   wherein the switching module (70) can be separated from the base body (10) without disassembling the at least one electrically controllable valve (200, 201) and the at least one electronic computer and memory module (150).

2. The gripping device according to claim 1, wherein the base body (10) has a lower side (13) opposite the carriages (100, 101) or swivel arms to which an upper side (72) of the switching module (70) is attached.

3. The gripping device according to claim 2, wherein the switching module (70) has on its lower side facing away from the base body (10) a module-specific machine-side adapter surface (73) that is substantially similar to the lower side (13) of the base body (10).

4. The gripping device according to claim 1, wherein the at least one sensor (155) detects, alternatively or in combination, at least position, distance, speed and acceleration as physical parameters.

5. The gripping device according to claim 1, wherein the computer and memory module (150) of the switching module (70) has a timer.

6. The gripping device according to claim 1, wherein the computer and memory module (150) converts the at least one detected physical parameter into optical or acoustic signals in order to make them available at the module housing (71) via at least one display or reproduction device.

7. The gripping device according to claim 1, wherein the at least one electrically controllable valve are a plurality of directional valves (200, 201), each having a shut-off rest position and being pilot-controlled pneumatically or hydraulically on both sides.

8. The gripping device according to claim 1, wherein a proportional controller (250) is connected upstream of the at least one electrically controllable valve (200, 201).

9. The gripping device according to claim 8, wherein the proportional controller (250) has at least two electrically controllable directional valves (251, 252), a pressure sensor (180) generating electrical signals and an amplifier (261).

10. The gripping device according to claim 1, wherein in that at least one electrically controllable valve (200, 201) is a cartridge valve.

11. The gripping device according to claim 1,
    wherein the base body comprises a channel-like sensor recess (66) which aligns with a corresponding recess of the switching module (70) and accommodates the at least one sensor (155, 180).

12. The gripping device according to claim 1,
    wherein an upper side (72) of the module housing (71) comprises an indentation into which a piston of the cylinder-piston unit (120) can partially protrude in the closed position.

13. The gripping device according to claim 1,
    wherein an upper side (72) of the module housing (71) comprises fastening bores (69) which receive screws for attaching the module housing to the base body.

14. The gripping device according to claim 1,
    wherein a flat seal is disposed between the module housing and the base body.

15. The gripping device according to claim 1,
    wherein a valve vent bore of the at least one electrically controllable valve is in fluid communication with a vent filter through bores inside the module housing.

16. The gripping device according to claim 1,
    wherein the switching module (70) is connected to an external controller (550) by a cable which combines a power cable (561) and a multi-wire connection (557) and
    wherein the multi-wire connection (557) is operatively connected to a data interface (586) in the gripping device.

* * * * *